April 17, 1934.　　O. L. MORRISON ET AL　　1,955,307
SANDING DEVICE FOR MOTOR VEHICLES
Filed Nov. 9, 1931
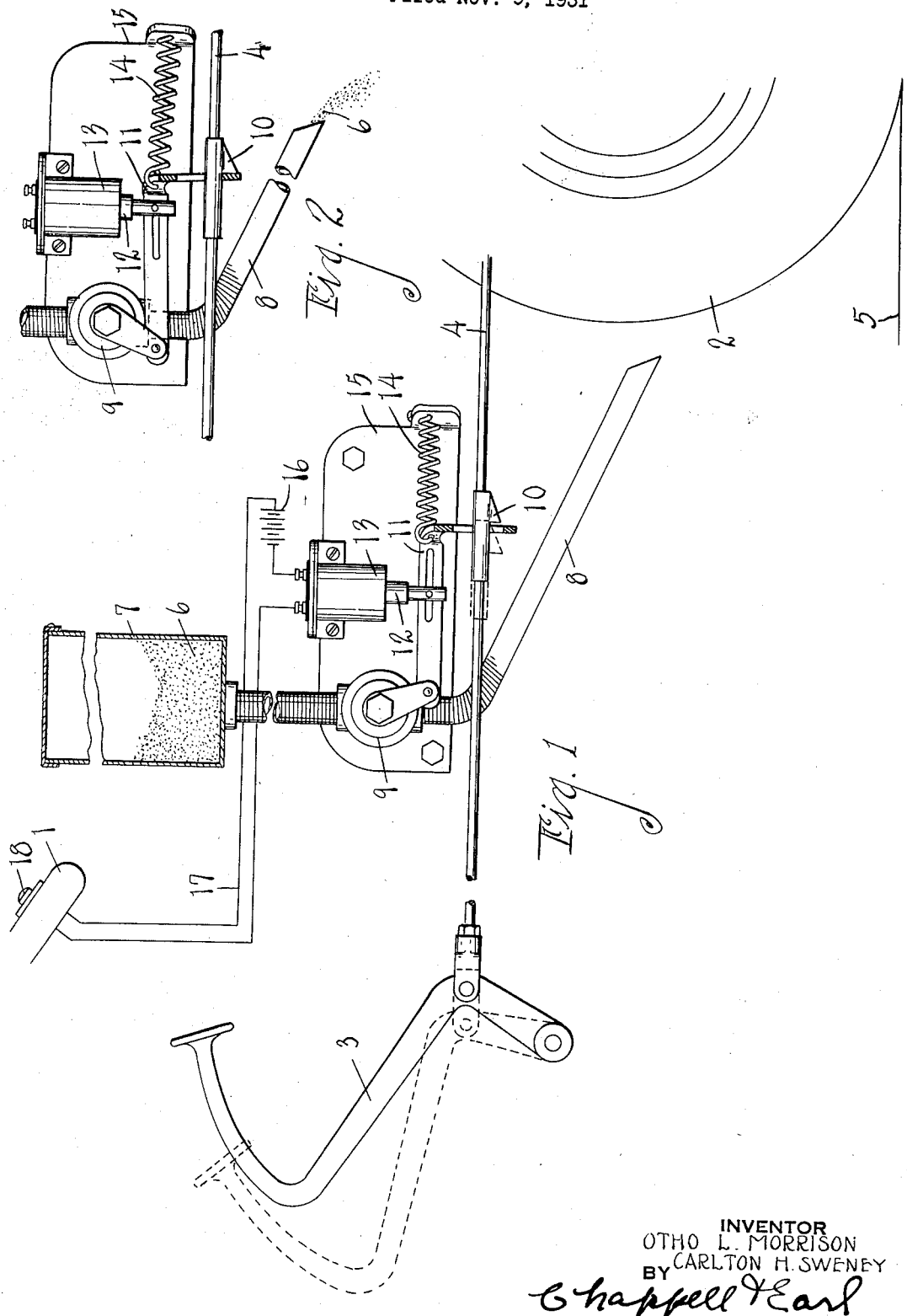
INVENTOR
OTHO L. MORRISON
CARLTON H. SWENEY
BY
Chappell & Earl
ATTORNEYS Patented Apr. 17, 1934

1,955,307

UNITED STATES PATENT OFFICE 1,955,307

SANDING DEVICE FOR MOTOR VEHICLES

Otho L. Morrison and Carlton H. Sweney, Kalamazoo, Mich.

Application November 9, 1931, Serial No. 573,830

3 Claims. (Cl. 291—15)

The main object of our invention is to provide an improved sanding device for automotive vehicles and the like.

Another object of our invention is to provide a sanding device having means associated with the brake for simultaneously applying sand with the application of the brake, said means being under the manual control of the operator.

Objects relating to details and economies of our invention will appear from the description to follow. The invention is defined and pointed out in the claims.

A structure which is a preferred embodiment of our invention is illustrated in the accompanying drawing, in which:

Fig. 1 is a fragmentary view of the device associated with a motor vehicle, the device being shown in non-sanding position, and Fig. 2 is a view similar to Fig. 1 of the valve control mechanism alone in sanding position.

Referring to the drawing, numeral 1 represents the steering wheel of an automotive vehicle and 2 one of the traction wheels which is controlled by brake pedal 3 through the brake rod 4, the brake not being shown. The brake rod 4 is adapted to actuate the brake for stopping the supporting wheel 2 which is adapted to roll on a support.

The granular material, such as sand 6, within the container 7 is adapted to flow by gravity through the conduit 8 when the valve 9 is open so as to distribute the sand over the surface 5 in front of wheel 2 so as to increase the friction between the wheel and the supporting surface when the brake pedal 3 is moved to braking position, as shown by the dotted lines in Fig. 1, to stop the vehicle, or to assist in starting the vehicle.

The brake rod 4 is provided with a tappet 10. The pawl 11 is connected to valve 9 and is adapted to be moved into or out of the path of the tappet 10 by armature 12 of the electro-magnet 13. A tension spring 14 is connected to the pawl 11 and to the supporting member 15 for urging the pawl 11 to valve closing position.

The electro-magnet 13 is connected to the battery 16 by the electric circuit 17 which is in turn controlled by the push button switch 18 carried by the steering wheel 1. The arrangement is such that when the push button switch 18 is closed by the operator, the electro-magnet 13 is energized thereby raising its armature 12 which carries with it the pawl 11, as illustrated by Fig. 2. In this position, when the brake pedal 3 is depressed, the tappet 10 is moved forward by brake rod 4 and engages the pawl 11 and moves it to open the valve 9 which permits sand 6 to flow through the conduit 8. When the push button 18 is released, the electro-magnet 13 is de-energized, thereby permitting the pawl 11 to fall to the position as illustrated by Fig. 1. In this position of the pawl, the tappet 10 is free to move with the brake rod 4 without engaging the pawl 11.

The spring 14 acts (1) to retract the slide and pawl 11 to close the valve 9 on the retraction of the brake rod and also (2) to return the pawl to its normal position on the de-energization of the electromagnet 13. The spring resiliency holds the valve closed and the pawl out of the path of the tappet so long as the electromagnet remains de-energized.

In our improved sanding device, if desired, sand may be applied when the brake is actuated to stop the vehicle and the connection between the brake and the sand applying valve is under the manual control and within convenient reach of the operator.

It is obvious that various changes and modifications may be made in the details of construction and design of the above specifically described embodiments of our invention without departing from the spirit thereof, such changes and modifications being restricted only by the scope of the following claims.

Having thus described our invention, what we claim as new and desire to secure by Letters Patent, is:

1. In an apparatus of the class described, the combination of a brake rod, a container for granular material, a discharge conduit for said container provided with a valve, a pawl connected to said valve and provided with a spring acting to normally close the valve and move the pawl to inoperative position, a tappet on said brake rod, an electromagnet having an armature connected to said pawl and adapted when actuated to move the pawl into the path of said tappet, and a switch for controlling said electromagnet.

2. In a device of the class described, the combination with a discharge valve for granular material, a movable brake member, a pawl connected to said valve, a tappet on said brake member, means acting to close said valve and normally hold said pawl out of the path of said tappet, and a manually controlled electric control member for moving said pawl into the path of said tappet.

3. In a sanding device for vehicles, the combination of a sand discharge valve having a crank, a supporting member, a horizontal slide connected at one end to said crank and having a depending pawl provided with an opening, a horizontal tension spring conecting the other end of said slide to said supporting member, a brake rod arranged through said opening and having a depending tappet adapted to reciprocate with the brake rod through the opening, an electromagnet mounted on said support and having a depending armature adapted to elevate said slide when the electromagnet is energized whereby to elevate said pawl into the path of said tappet so that when the brake rod is actuated, the tappet engages said pawl and advances the slide to open the valve, the spring acting to retract said slide and pawl to close the valve on the retraction of the brake rod and to return the pawl to its normal position on the de-energization of said electromagnet.

OTHO L. MORRISON.
CARLTON H. SWENEY.